Aug. 25, 1964
R. E. PRICE ETAL
3,145,507
AXIAL LOCATING MEANS FOR WORKPIECES
Filed March 1, 1962
3 Sheets-Sheet 1
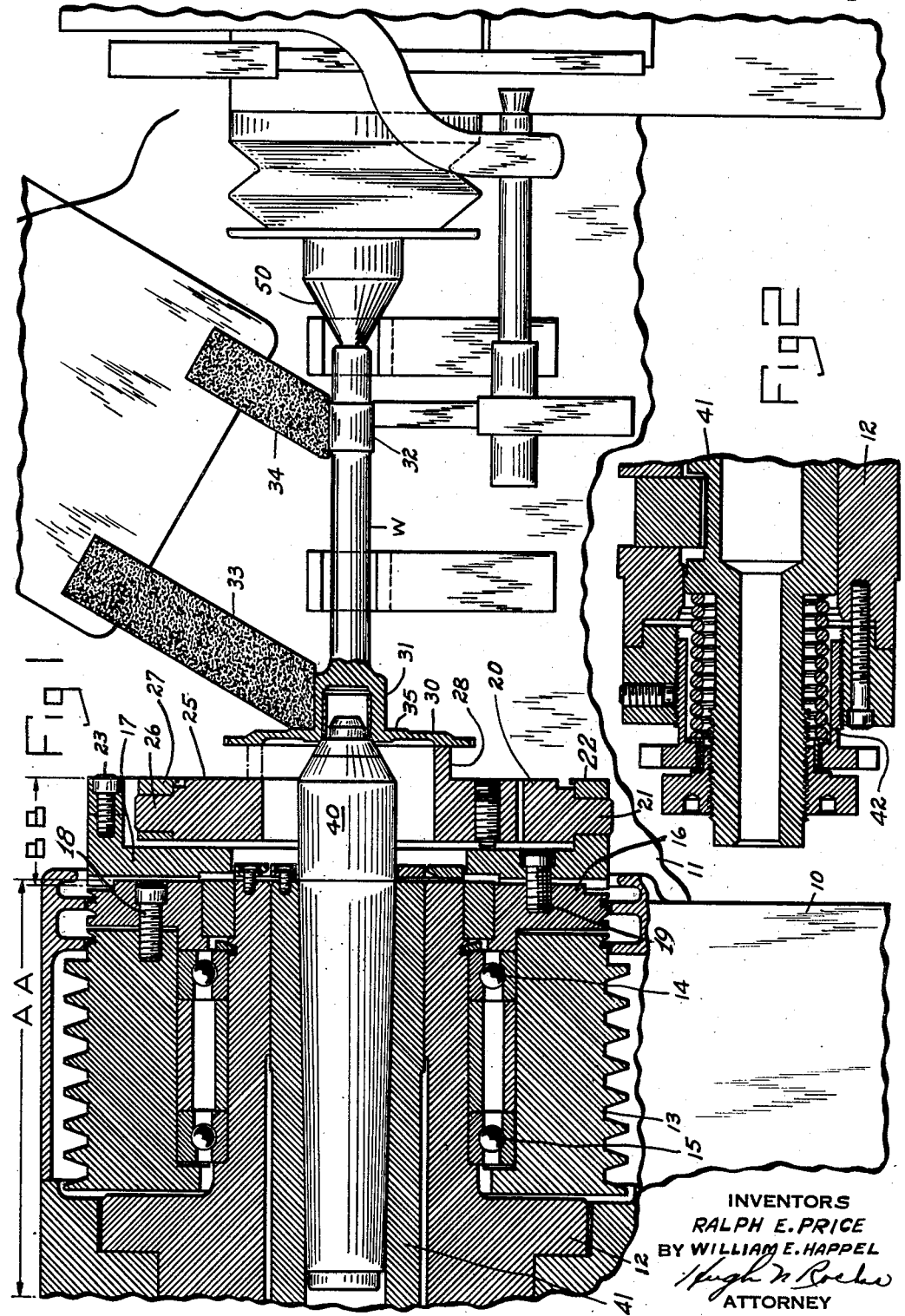
INVENTORS
RALPH E. PRICE
BY WILLIAM E. HAPPEL
ATTORNEY

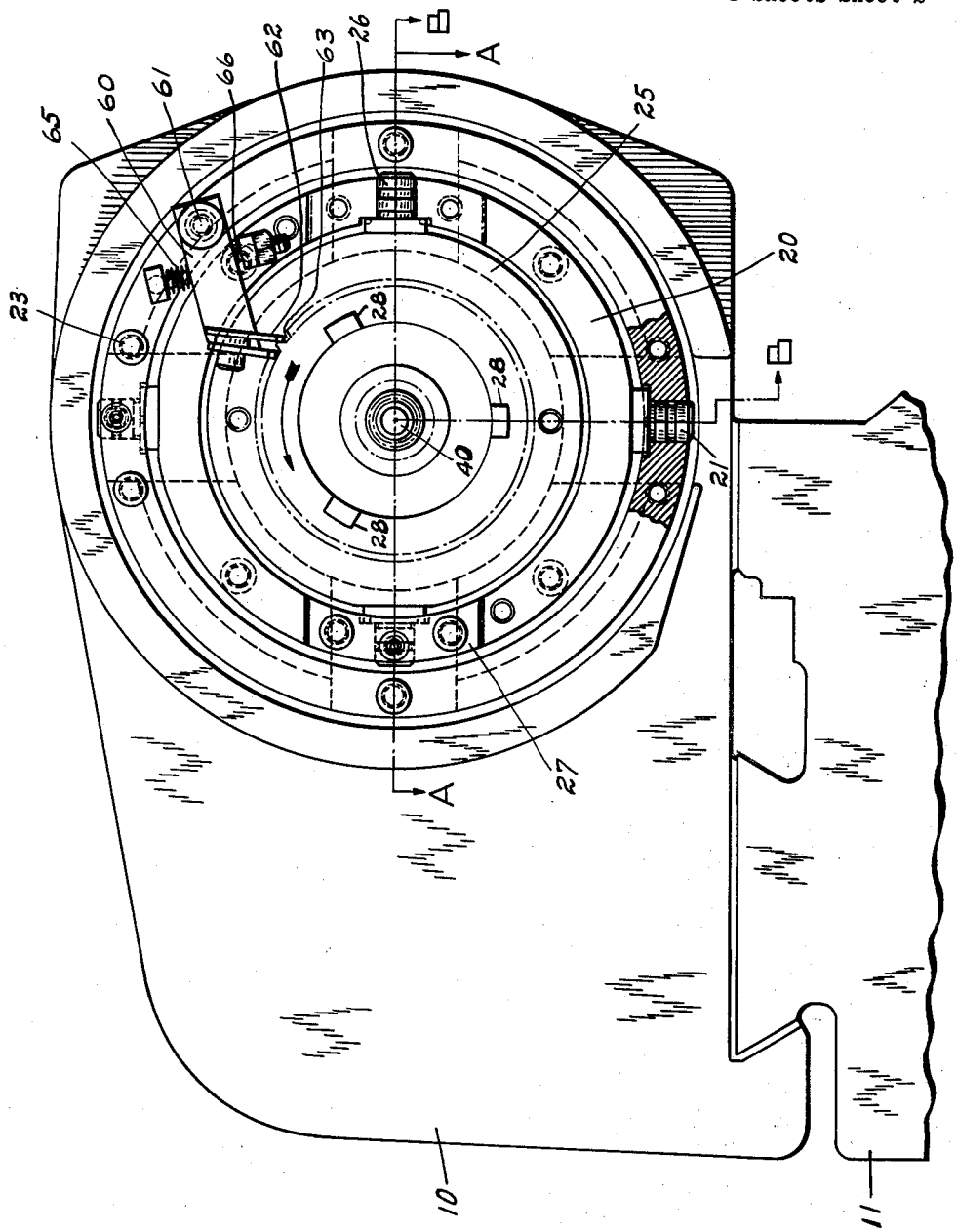

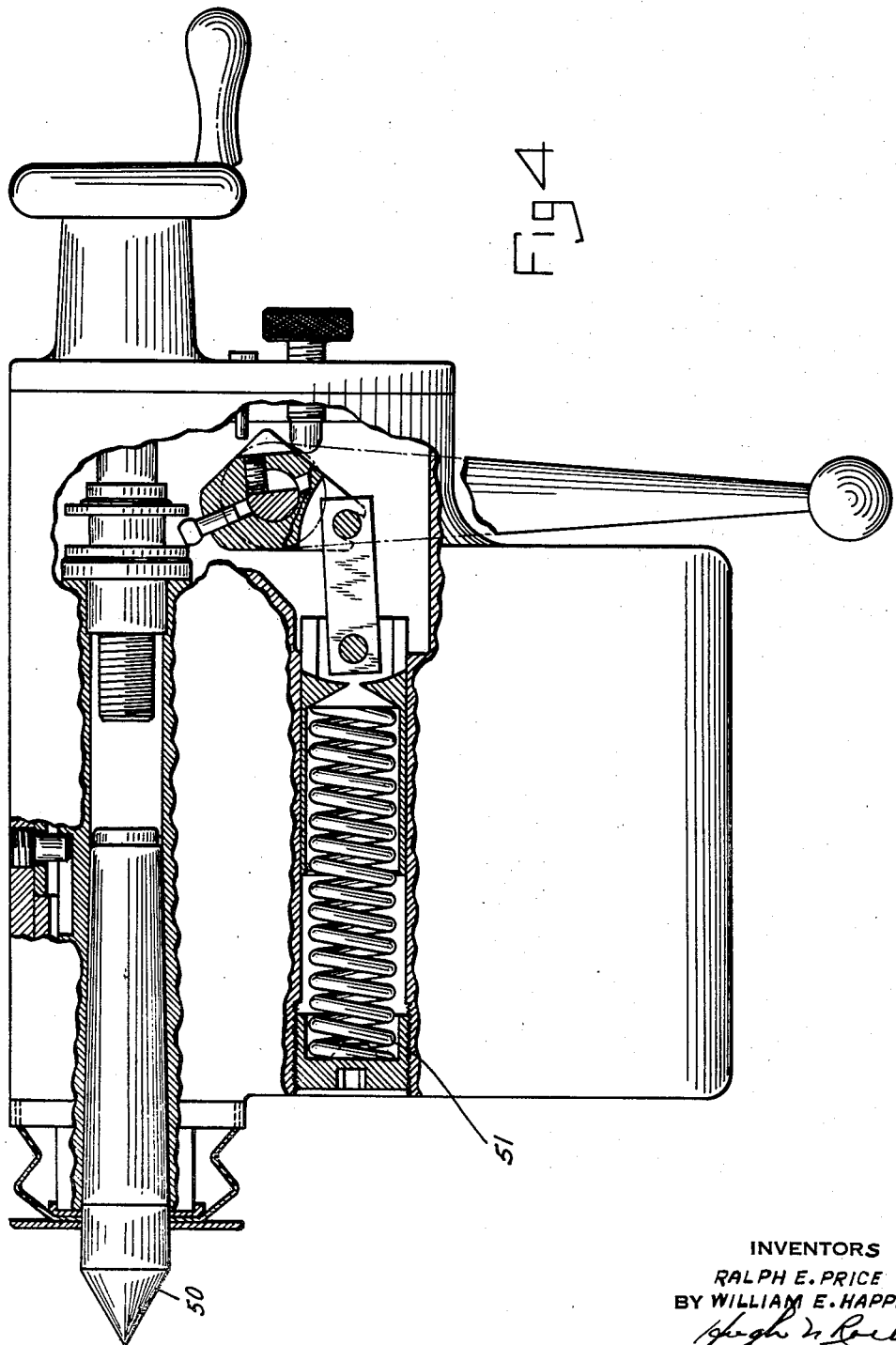

United States Patent Office 3,145,507
Patented Aug. 25, 1964

3,145,507
AXIAL LOCATING MEANS FOR WORKPIECES
Ralph E. Price and William E. Happel, Waynesboro, Pa., assignors to Landis Tool Company, Waynesboro, Pa.
Filed Mar. 1, 1962, Ser. No. 176,561
5 Claims. (Cl. 51—105)

This invention relates to grinding machines, particularly cylindrical grinding machines, and more particularly, to means for axially locating workpieces from a flange or other end surface on the workpiece.

The reference surface from which the axial location of a workpiece for a grinding operation is determined, is selected by the user of the machine in accordance with a predetermined series of operations on the workpiece.

Where the reference surface is a flange or other end surface on a workpiece, the locating surface is usually the face plate on the headstock or means attached to the face plate. For many tolerance requirements, the face plate does not run true enough to serve as a locating surface.

Where the end portion of the workpiece includes an annular surface to be ground, it is essential that it is protected against run-out of the face plate which would cause axial movement of the work relative to the grinding wheel.

It is, therefore, an object of the present invention to provide means rotatable with the face plate having a work engaging surface free to adapt itself to the reference surface of a workpiece.

Another object is to provide means whereby the workpiece is properly supported on the headstock center before it engages the locating surface.

Another object is to provide means to isolate a workpiece from the effect of run-out of the face plate.

FIG. 1 is a sectional elevation of a headstock spindle with the section marked B—B taken along the line B—B of FIG. 3 and the section marked A—A taken along the line A—A of FIG. 3.

FIG. 2 is a partial front view, in section, showing the left hand end of the headstock spindle.

FIG. 3 is a right hand end view of a headstock.

FIG. 4 is a plan view of a footstock, partly in section.

A grinding machine headstock 10 mounted on swivel table 11 has a non-rotatable spindle 12 on which a work drive pulley 13 is rotatably supported on anti-friction bearings 14 and 15.

Face plate 16 is attached to pulley 13 by screws 18 and face plate adapter 17 is attached to face plate 16 by screws 19.

Annular driving plate 20 has oppositely disposed trunnion members 21 for pivotally supporting itself on adapter 17. Adapter plate cap 22 is secured to adapter 17 by screws 23 to hold trunnion members 21 in place.

Annular locator plate 25 has oppositely disposed trunnion members 26 for pivotally supporting itself on annular driving plate 20 to which it is secured by locator plate caps 27 which hold trunnion members 26 in place. Locator plate 25 has angularly spaced, axially projecting portions 28 for engaging and locating flange 30 of workpiece W.

Headstock center 40 is supported in sleeve 41 which, in turn, is slidably mounted in spindle 12. Spring 42 at the outer end of headstock 10 normally holds sleeve 41 and headstock center 40 in a position to receive a workpiece before flange 30 engages portions 28. With this arrangement, workpiece W is firmly supported on both the headstock center 40 and portions 28.

The other end of workpiece W is engaged by footstock center 50 which is urged against said workpiece by spring 51. Spring 51 exerts a force greater than spring 42 and, therefore, footstock center 50 moves workpiece W and headstock center 40 to the left until flange 30 engages the portions 28.

Workpiece W has two portions 31 and 32 to be ground by grinding wheels 33 and 34. An annular surface 35 of workpiece W is also ground by grinding wheel 33. It is obvious that endwise movement of the work due to run-out of the face plate 16 or any other cause would prevent a satisfactory grinding operation on surface 35 of workpiece W. This invention prevents such run-out by supporting the locating surfaces on a universal mounting and yieldingly holding the workpiece in spaced relation to the locating surfaces so that the workpiece is first firmly engaged by the headstock center and then by the locating surfaces.

The means for driving workpiece W consists of a bar 60 pivotally attached to face plate adapter 17 at 61. A pair of work engaging fingers 62 are attached to the other end of bar 60 and are free to move axially in notches 63 of workpiece W. Bar 60 is resiliently held in position for engaging workpiece W by means of spring 65 attached to face plate adapter 17 and an adjustable abutment 66 attached to annular driving plate 20.

We claim:

1. In a grinding machine, a grinding wheel, means for rotatably supporting and locating a cylindrical workpiece having a locating surface at one end for a grinding operation comprising a headstock and a footstock, a center in said headstock, a center in said footstock, a first resilient means for urging said headstock center toward said footstock center, a second resilient means for urging said footstock center toward said headstock center, said second resilient means exerting a greater force than said first resilient means, means for axially locating said workpiece relative to said grinding wheel comprising a face plate on said headstock, a first member pivotally mounted on said face plate on a first radial axis, a second member pivotally mounted in said first member on a radial axis at right angles to said first radial axis, said second member having locating means for engaging said locating surface of said workpiece, said workpiece and said headstock center being adapted to be moved axially by said footstock center until said locating surface engages the locating means on said second member.

2. In a grinding machine, a grinding wheel, means for rotatably supporting and positioning a cylindrical workpiece comprising a headstock and a footstock, a center in said headstock, a center in said footstock, a face plate on said headstock, said workpiece having a reference surface on the end adjacent said headstock, means on said face plate for positioning said workpiece axially relative to said grinding wheel comprising a first member pivotally mounted on said face plate on a first radial axis, a second member pivotally mounted in said first member along a radial axis at right angles to said first radial axis, locating means on said second member for engaging and locating said reference surface of said workpiece, means to hold said headstock center normally in position to support said workpiece with said reference surface in axially spaced relation to said locating means, and means to move said workpiece and said headstock center axially against said holding means until said reference surface engages said locating means.

3. In a grinding machine, a grinding wheel, means for rotatably supporting a cylindrical workpiece comprising a headstock and a footstock, a center in said headstock, a center in said footstock, a face plate on said headstock, means for positioning said workpiece axially relative to said grinding wheel comprising locating means on said face plate, an end surface on said workpiece for co-acting with said locating means, a universal connection between said locating means and said face plate, yielding means to hold said headstock center normally in position to support said workpiece with said end surface in axially spaced relation to said locating means, and means to hold said workpiece against said locating means.

4. In a grinding machine, a grinding wheel, means for rotatably supporting and positioning a cylindrical workpiece comprising a headstock and a footstock, a center in said headstock, a center in said footstock, a face plate on said headstock, means for positioning said workpiece axially relative to said grinding wheel comprising locating means on said face plate, an end surface on said workpiece for co-acting with said locating means, a universal connection between said locating means and said face plate, means to hold said headstock center normally in position to support said workpiece with said end surface in axially spaced relation to said locating means, and means to move said workpiece and said headstock center axially against said holding means until said workpiece engages said locating means.

5. In a grinding machine, a grinding wheel, means for rotatably supporting a cylindrical workpiece comprising a headstock and a footstock, a center in said headstock, a center in said footstock, a face plate on said headstock, means for positioning said workpiece axially relative to said grinding wheel comprising locating means on said face plate having arcuately spaced and axially extending members, an end surface on said workpiece for co-acting with said locating means, a universal connection between said locating means and said face plate, yielding means to hold said headstock center normally in position to support said workpiece with said end surface in axially spaced relation to said locating means, and means to hold said workpiece against said arcuately spaced and axially extending members.

References Cited in the file of this patent

UNITED STATES PATENTS

| | | |
|---|---|---|
| 1,854,618 | McGrady | Apr. 19, 1932 |
| 2,526,796 | Asbridge | Oct. 24, 1950 |

FOREIGN PATENTS

| | | |
|---|---|---|
| 823,559 | Germany | Dec. 3, 1952 |